United States Patent [19]

Park

[11] Patent Number: 5,862,108
[45] Date of Patent: Jan. 19, 1999

[54] METHOD AND APPARATUS FOR RECORDING AND REPRODUCING LANGUAGE LEARNING INFORMATION ON/FROM A COMPACT DISK

[75] Inventor: Sang Jun Park, Suwon, Rep. of Korea

[73] Assignee: Samsung Electronics Co., Ltd., Kyungki-do, Rep. of Korea

[21] Appl. No.: 885,948

[22] Filed: Jun. 30, 1997

Related U.S. Application Data

[62] Division of Ser. No. 639,799, Apr. 29, 1996, Pat. No. 5,771,212.

[30] Foreign Application Priority Data

Jul. 31, 1995 [KR] Rep. of Korea ...................... 95-23575
Jul. 31, 1995 [KR] Rep. of Korea ...................... 95-23579

[51] Int. Cl.$^6$ .................................................. G11B 17/22
[52] U.S. Cl. ............................................. 369/33; 369/47
[58] Field of Search .................................. 369/33, 32, 3, 369/4, 5, 48, 58, 47, 275.3, 54

[56] References Cited

U.S. PATENT DOCUMENTS

| | | | |
|---|---|---|---|
| 4,996,679 | 2/1991 | Yoshio ...................................... | 369/33 |
| 5,159,143 | 10/1992 | Emi et al. ................................. | 369/33 |
| 5,249,166 | 9/1993 | Hamilton et al. ......................... | 369/32 |
| 5,257,253 | 10/1993 | Otsubo et al. ............................ | 369/48 |
| 5,428,184 | 6/1995 | Park ........................................... | 369/4 |
| 5,550,920 | 8/1996 | Nomura ..................................... | 381/1 |

*Primary Examiner*—Tan Dinh
*Attorney, Agent, or Firm*—Sughrue, Mion, Zinn, Macpeak & Seas, PLLC

[57] ABSTRACT

A method and apparatus for reproducing language learning information data from a compact disk. On a compact disk, audio data is recorded separately on left and right channels of a general signal area of the compact disk. Sub-Q data, reproduction information data, and language learning data are alternately recorded between adjacent groups of the audio data recorded separately on the left and right channels of the general signal area of the compact disk. The reproduction information data is detected from the general signal area of the compact disk. The reproduction order of the L and R channels is determined in response to the detected reproduction information data, and the audio data recorded on the compact disk is reproduced in the determined reproduction order.

6 Claims, 4 Drawing Sheets

METHOD AND APPARATUS FOR RECORDING AND REPRODUCING LANGUAGE LEARNING INFORMATION ON/ FROM A COMPACT DISK

This is a divisional of application Ser. No. 08/639,799 filed Apr. 29, 1996 and now is U.S. Pat. No. 5,771,212.

BACKGROUND OF THE INVENTION

1. Field of the Invention

The present invention relates in general to a method and apparatus for recording information used to assist an individual in learning a language ("language learning information") onto a compact disk, and for reproducing the same. More particularly, the present invention is directed to a method and apparatus for recording and reproducing language learning information on/from a compact disk, in which sub-Q data and language learning data are alternately recorded on a portion of the compact disk.

The present invention further relates to a method and apparatus for recording language learning information on a compact disk, in which audio data is recorded and reproduced separately on/from left and right channels of the compact disk, thereby doubling the recording/reproduction capacities of the compact disk.

2. Description of the Related Art

Generally, a compact disk is constructed of a circular plate having a diameter of 12 cm. Typically, the compact disk is recorded at a high density with audio data, and with program data, which is indicative of the various information associated with the recorded audio data. Reproduction of the recorded audio data typically requires at least one hour. The data is reproduced by a pickup device in a non-contact fashion, such that the tracks recorded with the audio data are not abraded. This type of non-contact reproduction prolongs the life of the compact disk.

Since the compact disk is digitally recorded, there is very little, if any, signal degradation. Therefore, such a compact disk will exhibit a high signal-to-noise ratio (S/N ratio) of at least 90 dB, as compared to a conventional circular plate disk. A compact disk is also generally provided with an aluminum reflecting film to cover the portion recorded with the audio data. This guards against external forces and yields a more durable compact disk.

In general terms, a compact disk has three areas in which information is recorded. The three areas include a lead-in area, a general signal area, and a lead-out area. On the general signal area, the general audio data is recorded. On the lead-in area, various program data associated with the audio data recorded on the general signal area is recorded. On the lead-out area, program data indicative of the fact that all information recorded on the compact disk has been reproduced is recorded.

In operation, the program data associated with the audio data recorded on the compact disk is detected from the lead-in area in accordance with a user's selection, and a track position of the associated information is determined according to the detected program data. Then, the pickup device is positioned over the track on which the associated information is recorded, and the information is reproduced. In this manner, a desired one of a plurality of audio data recorded on the general signal area is reproduced.

FIG. 1 illustrates a data recording format of a compact disk as described above. The general signal area is recorded with sub-Q data every 13.3 ms, in addition to the general audio data. The sub-Q data refers to information regarding the audio data which is currently being reproduced. The sub-Q data is contained in 80 bits of information to indicate an address, serial number, index, and the required time regarding the associated audio data. The total required time and other information regarding the audio data are detected from the associated sub-Q data. A compact disk player analyzes the detected information and displays the analyzed result on a display panel, thereby informing the user of the information regarding the audio data currently being reproduced.

The sub-Q data is detected about 75 times per second, while the time information retrieved from the sub-Q data is displayed at a much smaller frequency, on the order of seconds. Thus, about 6000 bits (i.e., 80 bits/group of sub-Q data×75 groups/second) of sub-Q data are recorded repeatedly every second. In the end, the compact disk is recorded with a large amount of information that is redundant and/or never used.

As is generally known, compact disks are often used for music. Typically, such music compact disks are recorded in stereo, meaning that the audio data is simultaneously recorded on left and right channels (referred to hereinafter as L and R-channels) of the general signal area of the compact disk.

However, where the compact disk is used for assisting one to learn a language, it need not be recorded in stereo. In this case, the audio data is recorded on only one of the L and R-channels of the general signal area. This results in reduced recording efficiency.

SUMMARY OF THE INVENTION

Accordingly, in view of the above and other problems, it is a general object of the present invention to provide a method and apparatus for recording and reproducing language learning information on/from a compact disk, in which sub-Q data and language learning data are alternately recorded on a sub-Q data portion of a general signal area of the compact disk, so that the available recording area of the compact disk can be enlarged and used to record additional information for learning a language.

It is another object of the present invention to provide a method and apparatus for recording and reproducing language learning information on/from a compact disk, in which language learning data is recorded separately on L and R-channels of a general signal area of the compact disk. Here, sub-Q data and reproduction information data are alternately recorded on a sub-Q data part of the general signal area. The reproduction information data indicates the reproduction order of the recorded language learning data. As a result, the recording efficiency of the compact disk is increased.

In accordance with the above and other objects of the present invention, there is provided a method for recording language learning information on a compact disk. The method includes the step of alternately recording sub-Q data and language learning data between adjacent ones of audio data recorded on a general signal area of the compact disk, in such a manner that the total number (per second) of the recorded sub-Q data is M and the total number (per second) of the recorded language learning data is N, where M and N are natural numbers and M+N does not exceed 75 (per second). The language learning data indicates the contents of the recorded audio data.

In further accordance with the above and other objects of the present invention, there is provided a method for recording language learning information on a compact disk. The method includes the step of recording audio data separately on left and right channels of a general signal area of the compact disk, and alternately recording sub-Q data and reproduction information data between adjacent ones of the audio data recorded separately on the left and right channels of the general signal area of the compact disk, in such a manner that the total number (per second) of the recorded sub-Q data is N and the total number (per second) of the recorded reproduction information data is M, where N and M are natural numbers and N+M does not exceed 75 (per second). The reproduction information data indicates the reproduction order of the recorded audio data.

In further accordance with the above and other objects of the present invention, there is provided a method for recording language learning information on a compact disk. The method includes the step of recording audio data separately on left and right channels of a general signal area of the compact disk, and alternately recording sub-Q data, reproduction information data and language learning data between adjacent ones of the audio data recorded separately on the left and right channels of the general signal area of the compact disk, in such a manner that the total number (per second) of the recorded sub-Q data is N, the total number (per second) of the recorded reproduction information data is M, and the total number (per second) of the recorded language learning data is L, where N, M and L are natural numbers and N+M+L does not exceed 75 (per second). The reproduction information data indicates the reproduction order of the recorded audio data, and the language learning data indicates the contents of the recorded audio data.

In yet further accordance with the above objects of the present invention, there is provided a method for reproducing language learning information from a compact disk, including the steps of detecting reproduction information data from a general signal area of the compact disk, determining the reproduction order of channels in response to the reproduction information data detected at the first step, and reproducing audio data recorded on the compact disk in the determined reproduction order.

In even further accordance with the above objects, the present invention provides an apparatus for reproducing language learning information from a compact disk. The apparatus includes means for detecting reproduction information data from a general signal area of said compact disk, means for determining the reproduction order of channels in response to the reproduction information data detected, and means for reproducing audio data recorded on said compact disk in accordance with the determined reproduction order.

In still even further accordance with the above objects of the present invention, there is provided a compact disk including a general signal area, a plurality of groups of audio data recorded on said general signal area, and sub-Q data and language learning data alternately recorded between adjacent groups of the audio data recorded on the general signal area of the compact disk. The total number of groups of recorded sub-Q data is M and the total number of groups of recorded language learning data is N, where M and N are natural numbers and M+N does not exceed 75 per second, and wherein the language learning data indicates the contents of the recorded audio data.

The present invention further provides a compact disk including a general signal area having left and right channels, a plurality of groups of audio data recorded separately on the left and right channels of said general signal area, and sub-Q data and reproduction information data alternately recorded between adjacent groups of said audio data recorded. The total number of groups of recorded sub-Q data is N and the total number of groups of recorded reproduction information data is M, where N and M are natural numbers and N+M does not exceed 75. The reproduction information data indicates the reproduction order of the recorded audio data.

Even further, the above objects of the present invention are accomplished by a compact disk including a general signal area having left and right channels, audio data recorded separately on the left and right channels of said general signal area of said compact disk, and sub-Q data, reproduction information data and language learning data alternately recorded between adjacent groups of the audio data. The total number of groups of the recorded sub-Q data is N, the total number of groups of the recorded reproduction information data is M, and the total number of groups of the recorded language learning data is L, where N, M and L are natural numbers and the sum of N, M, and L does not exceed 75 per second. The reproduction information data indicates the reproduction order of the recorded audio data, and the language learning data indicates the contents of the recorded audio data.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 2:
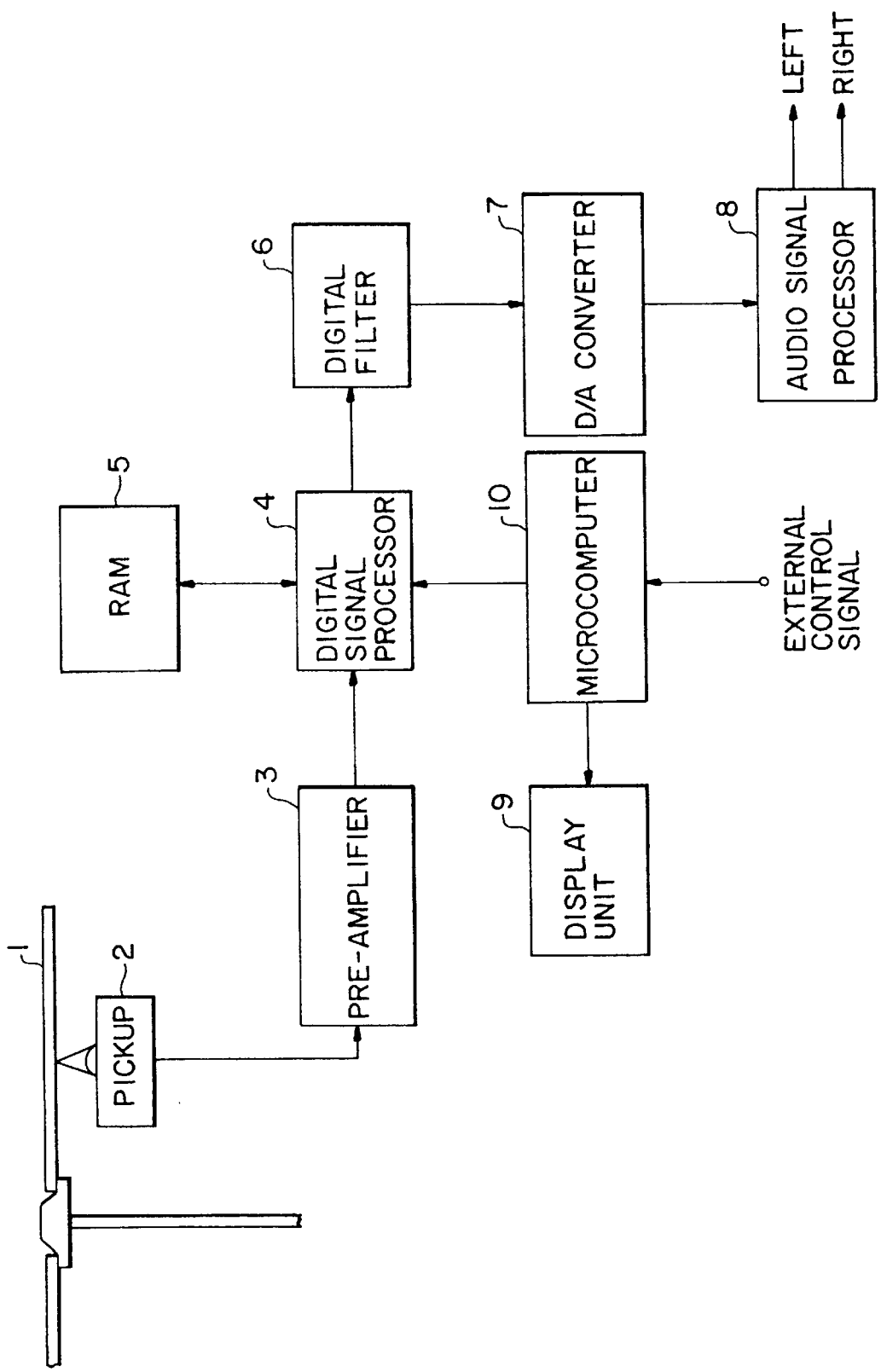
FIG. 2 is a schematic block diagram of a compact disk player in accordance with the present invention.

Referring to FIG. 2, there is shown a schematic block diagram of a compact disk player according to the present invention. The compact disk player includes a pickup 2 for detecting digital audio data and program data recorded on a compact disk 1. A pre-amplifier 3 amplifies the digital audio data and program data detected by the pickup 2 to a level suitable for signal processing. A digital signal processor 4 is coupled to the output of the pre-amplifier 3, and separates the digital audio data and program data amplified by the preamplifier 3 from each other. A random access memory (referred to hereinafter as RAM) 5 temporarily stores the program data separated by the digital signal processor 4. A digital filter 6 is coupled to the digital signal processor 4, and filters a noise component of the digital audio data separated by the digital signal processor 4. A digital/analog converter (referred to hereinafter as D/A converter) 7 converts the pure digital audio data from the digital filter 6 into analog audio data, which is then processed by an audio signal processor 8 and output as the resultant audio signal. A display unit 9 processes and displays sub-Q data and caption data recorded on a program area of the compact disk 1. A microcomputer 10 controls the entire operation of the compact disk player, including all of the above components.

The operation of the compact disk player as illustrated in FIG. 2, will hereinafter be described in detail with reference to FIGS. 3 to 5.

Figure 1:
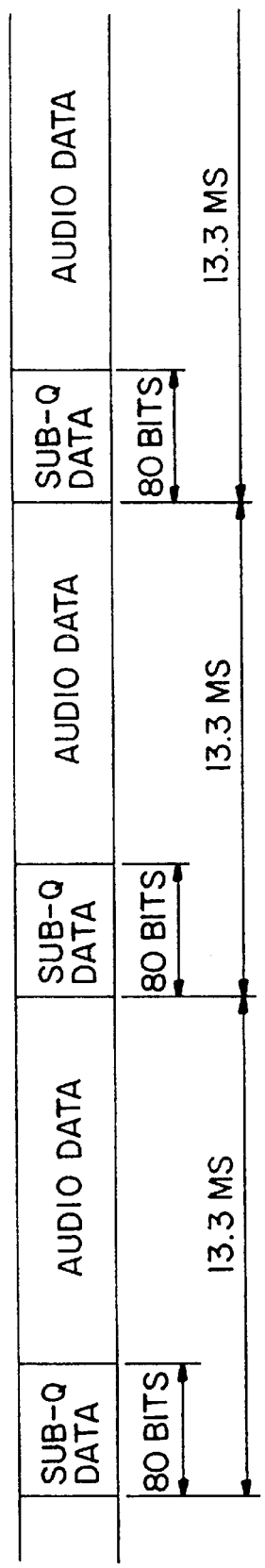
FIG. 1 illustrates a data recording format of a conventional compact disk.

As previously described with reference to FIG. 1, 80 bits of sub-Q data and audio data are successively recorded on the general signal area of the compact disk 1, at a period of 13.3 ms. The audio data is also recorded simultaneously on the L and R-channels of the general signal area. In the case where the compact disk 1 is recorded in stereo, the L and R-channels are simultaneously used for the recording and reproduction of one audio signal.

Figure 3:
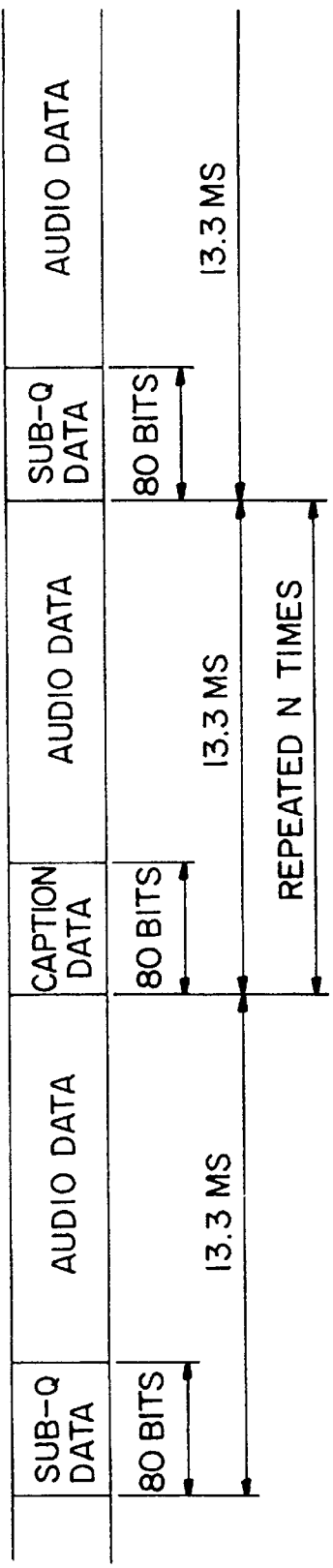
FIG. 3 illustrates a data recording format of a compact disk in accordance with a first embodiment of the present invention.

FIG. 3 illustrates a data recording format of the compact disk 1 in accordance with an embodiment of the present invention. As shown, the 80 bits of sub-Q data or 80 bits of language learning data (referred to hereinafter as "caption data") and the audio data are successively recorded on the general signal area of the compact disk 1, every 13.3 ms.

A method for reproducing language learning information from the compact disk 1 in accordance with the present invention will now be described.

When a reproduction function is selected by a user, the microcomputer 10 outputs a control signal to a spindle motor (not shown). In response, the spindle motor, which has its shaft coupled to the compact disk 1, is driven, thereby rotating the compact disk 1. As the compact disk 1 rotates, the program data on the lead-in area and the digital audio data on the general signal area are detected by the pickup 2 and amplified by the pre-amplifier 3 to a level suitable for subsequent signal processing. The program data on the lead-in area, amplified by the preamplifier 3, are temporarily stored into the RAM 5 through the digital signal processor 4. As a result, various information regarding the audio data recorded on the general signal area of the compact disk 1 can be detected from the RAM 5 according to a user's selection.

On the other hand, the digital audio data recorded on the general signal area, and amplified by the pre-amplifier 3, is separated from the program data recorded on the lead-in area by the digital signal processor 4 and then supplied to the digital filter 6. The digital filter 6 filters a noise component of the digital audio data separated by the digital signal processor 4. The resultant pure digital audio data is supplied to the D/A converter 7, which then converts the pure digital audio data into analog audio data. The audio signal processor 8 processes the analog audio data from the D/A converter 7 and outputs the resultant audio signals of the L and R-channels.

As described above, the 80 bits of sub-Q data and the language learning data ("caption data") are alternately recorded on the sub-Q data portion of the general signal area of the compact disk 1, every 13.3 ms. In the case where only sub-Q data is recorded on the general signal area of the compact disk 1 (as in the conventional art), information indicative of tune number, advanced time and total required time regarding the associated audio data is displayed on a display panel of the compact disk player. But, where the sub-Q data and the caption data are alternately recorded on the general signal area of the compact disk 1, as according to the present invention, the information indicative of tune number, advanced time and total required time, and caption information regarding the associated audio data are alternately displayed on the display panel of the compact disk player.

Stated differently, the sub-Q data and caption data recorded on the general signal area of the compact disk 1 are detected by the pickup 2, amplified by the preamplifier 3, and processed by the digital signal processor 4. The sub-Q data and caption data processed by the digital signal processor 4 are then supplied to the display unit 9 by the microcomputer 10. As a result, the sub-Q data and caption data processed by the digital signal processor 4 are displayed on the display panel of the compact disk player. When displayed, the sub-Q data indicates the tune number, advanced time and total required time regarding the associated audio data. A maximum of one group of sub-Q data and about 74 groups of caption data may be recorded every second.

However, in order to allow the compact disk player to perform more efficiently, the sub-Q data is recorded sequentially at odd numbered times and the caption data is recorded sequentially at even numbered times. In other words, the sub-Q data includes 4-bit address data for indicating a recorded position of the associated audio data. For this reason, in order to accurately detect the audio data, it is preferred to detect the sub-Q data in the fixed order. In this case, caption data of at least about 3000 bits can further be recorded on the sub-Q data portion of the general signal area of the compact disk 1 in addition to the sub-Q data. As a result, the recording efficiency of the compact disk is greatly improved. Further, the user can visually confirm the caption data displayed on the display panel of the compact disk player, resulting in a more efficient means of learning a language.

Figure 4:
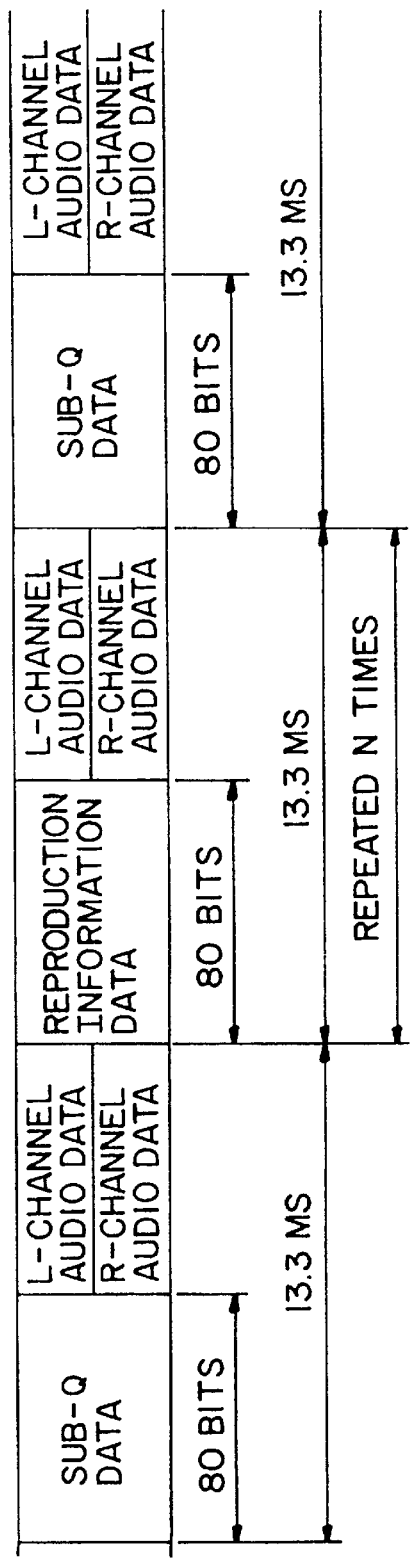
FIG. 4 shows a data recording format of a compact disk in accordance with a second embodiment of the present invention.

FIG. 4 illustrates a data recording format of the compact disk 1 in accordance with a second embodiment of the present invention. As shown in FIG. 4, the 80 bits of sub-Q data or 80 bits of reproduction information data and the audio data are successively recorded on the general signal area of the compact disk 1, every 13.3 ms. The audio data is also recorded separately on the L and R-channels of the general signal area.

In other words, a compact disk 1 recorded with information for learning a language need not be recorded in stereo, a monaural system is sufficient. In this connection, the L and R-channels of the general signal area can be used separately. The reproduction information data indicates the reproduction order of the recorded audio data. In order to sequentially reproduce the audio data of L and R-channels, it is preferred to alternately record the sub-Q data and the reproduction information data on the sub-Q data part of the general signal area of the compact disk 1.

The compact disk 1 is recorded with about 75 groups of sub-Q data per second, each of which contains information indicative of an address, serial number, index and required time regarding the associated audio data. Since the contents of the sub-Q data change once per second, about 74 groups of the sub-Q data are not necessary. Therefore, it is preferred to record alternatively the sub-Q data and the reproduction information data every 13.3 ms. Further, N groups of sub-Q data and M groups of reproduction information data can be recorded every second, where N+M does not exceed 75. Moreover, a desired number of the M groups of reproduction information data can be successively recorded. The reproduction information data indicates the reproduction order of the audio data of L and R-channels.

Lastly, a method for reproducing language learning information from the compact disk 1 in accordance with the second embodiment of the present invention will be described with reference to FIG. 5.

Figure 5:
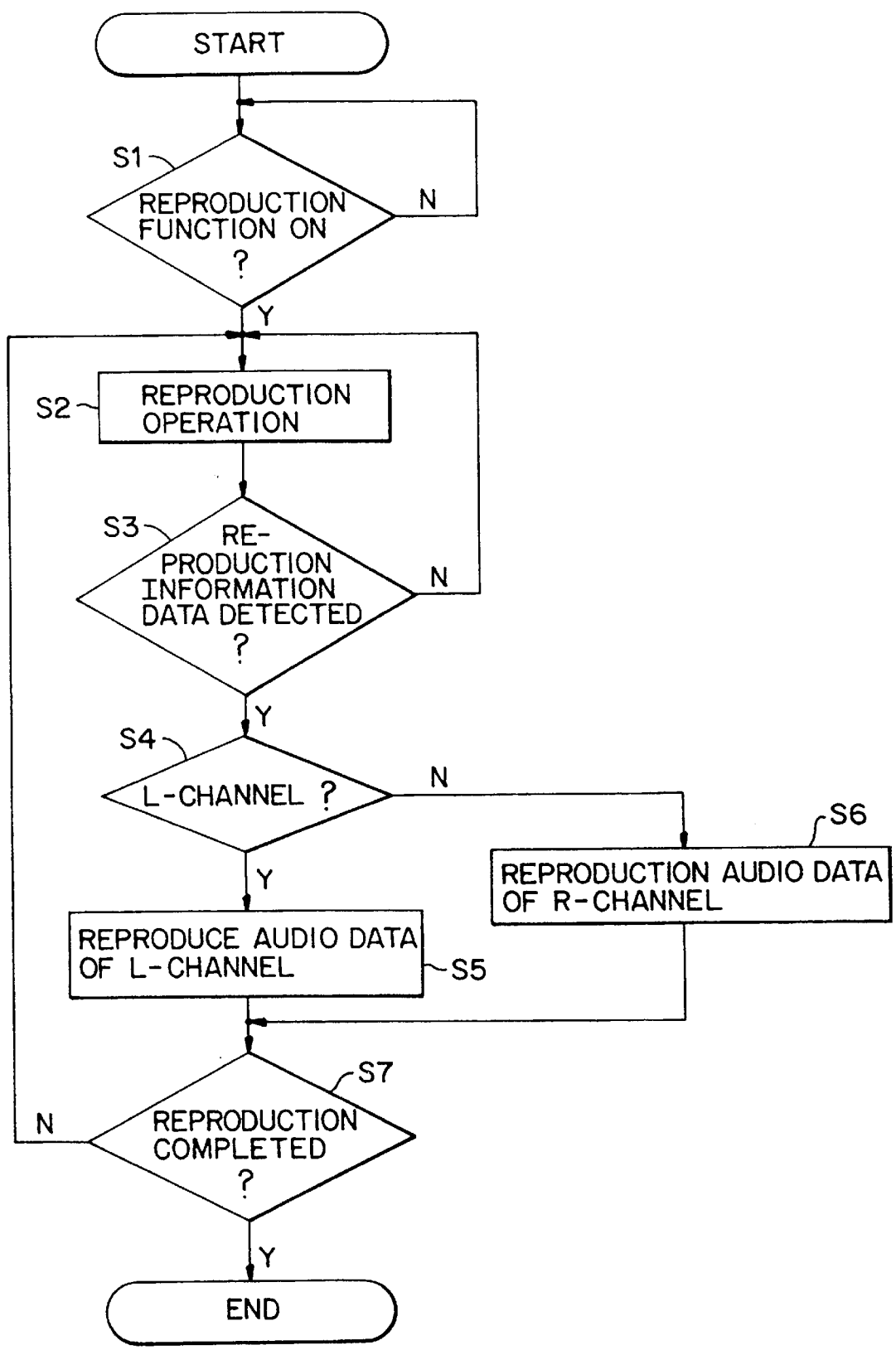
FIG. 5 is a flowchart illustrating the operation of the compact disk player of FIG. 2 in accordance with the present invention.

FIG. 5 is a flowchart illustrating the operation of the compact disk player of FIG. 2, particularly the microcomputer 10. At step S1, the microcomputer 10 checks whether the reproduction function has been selected by the user. If the reproduction function has not been selected by the user, the microcomputer 10 returns to step S1 and continues to check whether the reproduction function has been selected.

If the reproduction function has been selected by the user, the microcomputer 10 performs the reproduction operation at step S2. At step S2, the microcomputer 10 outputs the control signal to the spindle motor (not shown). In response to the control signal, the spindle motor, which has its shaft coupled to the compact disk 1, is driven, and begins to rotate the compact disk 1. As the compact disk 1 rotates, the program data on the lead-in area and the digital audio data on the general signal area are detected by the pickup 2 and then amplified by the pre-amplifier 3 to a level suitable for signal processing. The program data on the lead-in area, which is amplified by the pre-amplifier 3, is temporarily stored into the RAM 5 through the digital signal processor 4. Therefore, various information regarding the audio data recorded on the general signal area of the compact disk 1 can be detected from the RAM 5 according to a user's selection.

On the other hand, the digital audio data on the general signal area, which is amplified by the pre-amplifier 3, is separated from the program data on the lead-in area by the digital signal processor 4 and then supplied to the digital filter 6. The digital filter 6 filters a noise component of the digital audio data separated by the digital signal processor 4 and supplies the resultant pure digital audio data to the D/A converter 7. The D/A converter 7 converts the pure digital audio data into analog audio data. The audio signal processor 8 processes the analog audio data from the D/A converter 7 and outputs the resultant audio signals.

While performing the reproduction operation at step S2, the microcomputer 10 determines, at step S3, whether reproduction information data has been detected. If reproduction information data has not been detected, the microcomputer 10 returns to step S2 to continue the reproduction operation.

If the reproduction information data has been detected, the microcomputer 10 determines, at step S4, whether the reproduction information data is indicating the reproduction order of the L-channel. If so, the microcomputer 10 controls the pickup 2 at step S5 to reproduce audio data recorded on the L-channel of the general signal area of the compact disk 1.

On the other hand, if, in step S4, the reproduction information data does not indicate the reproduction order of the L-channel, the microcomputer 10 recognizes that the reproduction information data indicates the reproduction order of the R-channel and proceeds to step S6. As a result, the microcomputer 10 controls the pickup 2 at step S6 to reproduce audio data recorded on the R-channel of the general signal area of the compact disk 1.

After performing step S5 or S6, the microcomputer 10 determines at step S7 whether the reproduction operation has been completed. If the reproduction operation has not been completed, the microcomputer 10 returns to step S2 to repeat step S2 and the steps subsequent thereto. If the reproduction operation has been completed, the microcomputer 10 ends the entire operation. Therefore, the audio data can be recorded and reproduced separately on/from the L and R-channels of the general signal area of the compact disk 1. This has the effect of doubling both the recording and reproduction densities of the compact disk.

Alternatively, the language learning data in the first embodiment and the reproduction information data and audio data in the second embodiment may all be recorded on the compact disk. Further, the audio data recorded separately on the L and R-channels of the general signal area of the compact disk 1 are reproduced according to the reproduction order indicated by the reproduction information data. Therefore, the reproduction operation can be performed smoothly without interruption.

As apparent from the above description, according to the present invention, a portion of the 75 groups of sub-Q data is substituted with the caption data. Therefore, the recording efficiency of the compact disk is increased, and additional information used for learning a language can be recorded.

Further, the audio data is recorded separately on the L and R-channels of the general signal area of the compact disk. Therefore, the recording density of compact disk is doubled and thus its recording efficiency is increased, making room for additional information used for learning a language to be recorded on the disk.

Moreover, the audio data recorded separately on the L and R-channels of the general signal area of the compact disk are reproduced according to the reproduction order indicated by the reproduction information data. Therefore, the reproduction operation can be performed smoothly without interruption.

There has thus been shown and described a novel method and apparatus for recording and reproducing language learning information on/from a compact disk, which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A method for reproducing language learning information from a compact disk comprising the steps of:

detecting reproduction information data from a general signal area of said compact disk;

determining the reproduction order of channels in response to the reproduction information data detected, said step for determining including a step for analyzing the reproduction information data detected and, in accordance with the analyzed result, determining whether the left channel is to be reproduced; and reproducing audio data recorded on said compact disk in accordance with the determined reproduction order such that audio data of the left channel is reproduced if it is determined that the left channel is to be reproduced and reproducing audio data of the right channel if it is determined that the left channel is not to be reproduced.

2. A method for reproducing language learning information from a compact disk as set forth in claim 1, wherein the step of detecting reproduction information comprises the steps of:

determining whether a reproduction function has been selected;

performing a reproduction operation if it is determined that the reproduction function has been selected; and determining whether the reproduction information data has been detected from said general signal area of said compact disk, while performing the reproduction operation.

3. An apparatus for reproducing language learning information from a compact disk comprising:

means for detecting reproduction information data from a general signal area of said compact disk;

means for determining the reproduction order of channels in response to the detected reproduction information data, said means for determining including analyzing means for analyzing the reproduction information data detected and means coupled to said analyzing means for determining whether the left channel is to be reproduced in accordance with the analyzed result; and means for reproducing audio data recorded on said compact disk in accordance with the determined reproduction order such that audio data of the left channel is reproduced if it is determined that the left channel is to be reproduced and reproducing audio data of the right channel if it is determined that the left channel is not to be reproduced.

4. An apparatus for reproducing language learning information from a compact disk as defined by claim 3, wherein said means for detecting reproduction information comprises:

means for determining whether a reproduction function has been selected;

means for performing a reproduction operation if it is determined that the reproduction function has been selected; and means for determining whether the reproduction information data has been detected from said general signal area of said compact disk, while performing the reproduction operation.

5. An apparatus for reproducing language information from a compact disk comprising:

a detecting circuit operable to receive a signal from a pickup device, said signal including reproduction information data from a general signal area of said compact disk;

processor circuitry coupled to said detecting circuit and programmed to determine the reproduction order of channels in response to the detected reproduction information data, reproduce audio data recorded on said compact disk in accordance with the determined reproduction order, analyze the reproduction information data detected, determine whether the left channel is to be reproduced, and reproduce audio data recorded on said compact disk in accordance with the determined reproduction order such that audio data of the left channel is reproduced if it is determined that the left channel is to be reproduced, and audio data of the right channel is reproduced if it is determined that the left channel is not to be reproduced.

6. An apparatus for reproducing language learning information from a compact disk as defined by claim 5, wherein said processor circuitry is also programmed to determine whether a reproduction function has been selected, perform a reproduction operation if it is determined that the reproduction function has been selected, and determine whether the reproduction information data has been detected from said general signal area of said compact disk while performing the reproduction operation.

\* \* \* \* \*